United States Patent [19]

Richter

[11] Patent Number: 5,421,532
[45] Date of Patent: Jun. 6, 1995

[54] DEVICE FOR STORING THE SINGLE AND BUNDLE WIRES OF GLASS-FIBER CABLES IN DISTRIBUTOR DEVICES USED IN TELECOMMUNICATION AND DATA TRANSFER APPLICATIONS

[75] Inventor: Gerd Richter, Berlin, Germany

[73] Assignee: Krone Aktiengesellschaft, Berlin-Zehlendorf, Germany

[21] Appl. No.: 111,646

[22] Filed: Aug. 25, 1993

[30] Foreign Application Priority Data

Sep. 4, 1992 [DE] Germany .................. 42 29 884.9

[51] Int. Cl.[6] .......................................... B65H 75/18
[52] U.S. Cl. ................... 242/399.2; 242/400.1; 385/135
[58] Field of Search ............ 242/400.1, 399.2, 398, 242/405.1, 405.2, 613.3; 439/571, 572, 573; 385/135

[56] References Cited

U.S. PATENT DOCUMENTS

| 440,812 | 11/1890 | Keats | 242/613.3 |
|---|---|---|---|
| 4,702,551 | 10/1987 | Coulombe | 385/135 |
| 4,770,357 | 9/1988 | Sander et al. | 242/400.1 |
| 5,255,767 | 10/1993 | Norwood | 242/400.1 |

FOREIGN PATENT DOCUMENTS

| 0101970A1 | 3/1984 | European Pat. Off. . |
|---|---|---|
| 0222691A2 | 5/1987 | European Pat. Off. . |
| 3540472 | 11/1985 | Germany . |
| 3540473 | 3/1989 | Germany . |
| 9204490.5 | 8/1992 | Germany . |

*Primary Examiner*—John M. Jillions
*Attorney, Agent, or Firm*—McGlew and Tuttle

[57] ABSTRACT

A device for storing the single and bundle wires (16 or 5, respectively) of glass-fiber cables in distributor devices of telecommunication and data systems, comprising a casing (24), at least one cassette box pivotably mounted in the casing, and a splice cassette (10) mounted therein, is intended to be improved such that with a simplified construction of the cassette box and of the splice cassette (10), a break-proof support of the single and bundle wires (16 or 5, respectively) is permitted.

For this purpose the cassette box is formed of a support plate cassette (10) and provided with a slot (12) for passing the single and/or bundle wires (16,5) through and with members located on both side faces for supporting the single or bundle wires (16, 5) respectively.

10 Claims, 2 Drawing Sheets

DEVICE FOR STORING THE SINGLE AND BUNDLE WIRES OF GLASS-FIBER CABLES IN DISTRIBUTOR DEVICES USED IN TELECOMMUNICATION AND DATA TRANSFER APPLICATIONS

FIELD OF THE INVENTION

The invention relates to a device for storing the single and bundle wires of glass-fiber cables in distributor devices used in telecommunication and data transfer application.

BACKGROUND OF THE INVENTION

A device of the type referred to hereinbefore is known in the art from DE 35 40 472 C2. The splice cassette described in this patent publication is explained in more detail in DE 35 40 473 C2. In the device of the type referred to, the cassette box is adapted for receiving a splice cassette of a double-walled component. The splice cassette is formed of plastic and is provided with a winding body having a winding groove for winding the single and bundle wires of glass-fiber cables up. Such a device is, on one hand, complex with regard to the construction of the cassette box and of the splice cassette, and is not optimum with regard to the support of the single and bundle wires of glass-fiber cables in the winding groove of the winding body belonging to the splice cassette, and with regard to the protection from damage or breakage of the single or bundle wires, since the single and bundle wires are commonly wound up and can come under high tension when doing this.

SUMMARY AND OBJECTS OF THE INVENTION

It is therefore an object of the invention to improve the device of the type referred to hereinbefore and to guarantee, in particular, a higher protection from damage or breakage of single or bundle wires.

The solution of this object is achieved, according to the present invention, in that the cassette box is formed of a support plate provided with a receiving portion for the splice cassette and provided with a slot for passing the single and/or bundle wires through and with members located on both side faces for supporting the single or bundle wires, respectively. The device according to the present invention thus provides, for receiving the splice cassette, which my be a standard component, only a single support plate. The single support plate is formed, e.g., of a metal support sheet and is provided with a receiving portion for the splice cassette, the necessary members for supporting the single or bundle wires, respectively, being bent off on both side faces. Into the areal support plate according to the invention is inserted the splice cassette connecting a bundle wire to a single wire, whereupon the single wires are inserted on one side face of the support plate and the bundle wires on the other side of the support plate into the free spaces formed by the lugs. Thus, the single wires and the bundle wires are sorted separately and subsequently, and are received in the support plate, no winding operation taking place herefor, in contrast to the prior art, so that the bundle and single wires need not be held under tension. Having the single wires and the bundle wires independently from each other on different sides of the support plate permits an adaptation of the operator to the single wires being highly sensitive to breakage, so that they have to be very carefully slid under the lugs of the support plate.

Further advantageous embodiments of the invention are defined providing an extremely simple structure of the cassette box for receiving the splice cassette, comprising the one-piece support plate only, from which the necessary lugs and the receiving opening for supporting the splice cassette are cut free in U-shaped manner and are bent off in L-shaped manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
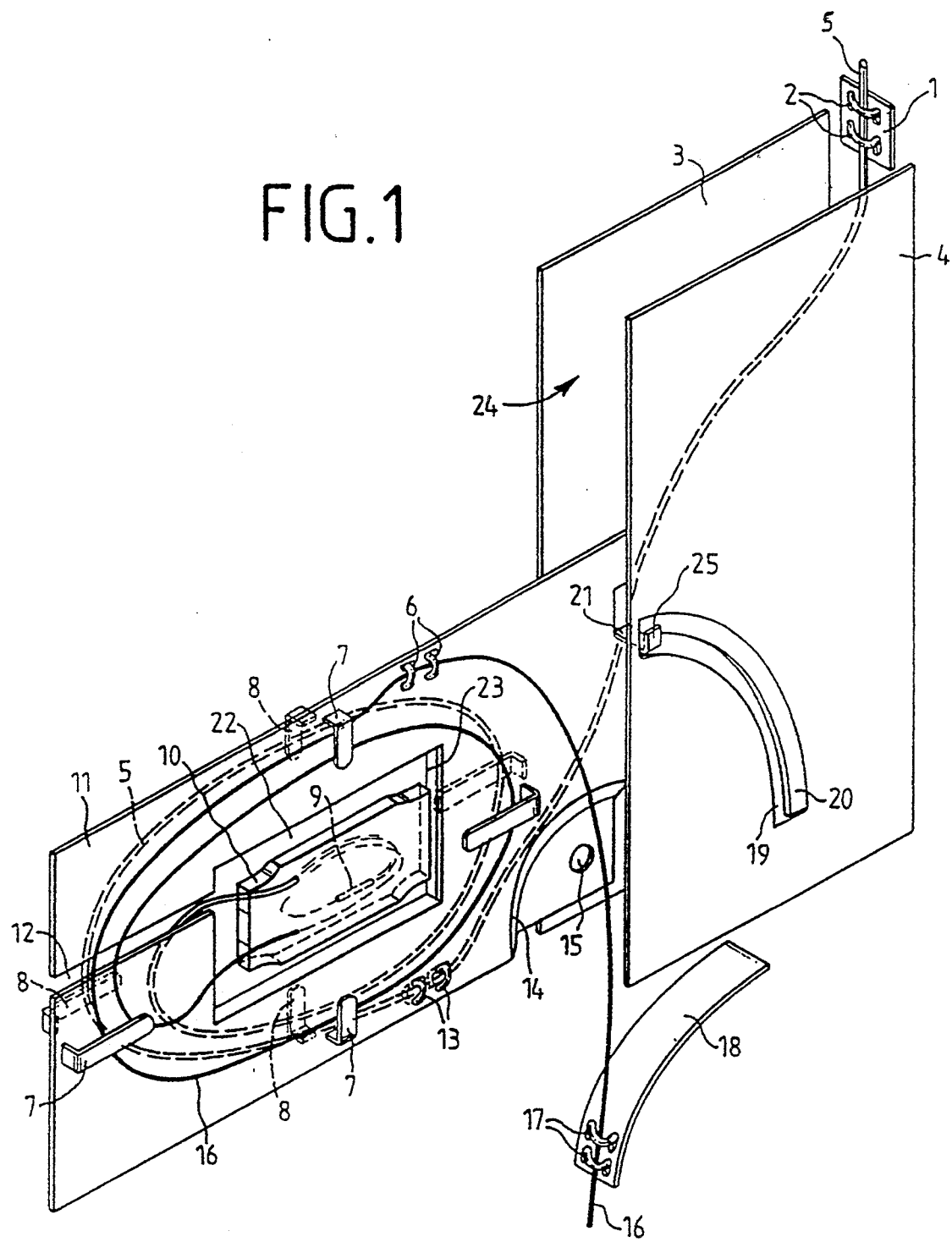
FIG. 1 is a perspective view of the device, with the support plate being folded out from the casing and the splice cassette being received therein.

A bundle wire 5 composed of several single wires 16 is fixed by means of cable binders 2 at a stationary support 1 above a casing 24 comprising two walls 3, 4 for a support plate 11. The two side walls 3, 4 of the casing 24 and the support plate 11 are each made of sheet-metal having the required stability and quality. The central portion 23 of the support plate 11 is cut free in U-shaped manner from the support plate 11 for forming a receiving opening 22 for a splice cassette 10, and is bent off in L-shaped manner onto one side of the support plate 11. Further, lugs 7, 8 are cut free in U-shaped manner from the edge sections of the support plate 11 and are also bent off onto the opposite sides and towards the receiving opening 22. A slot 12 extends through the support plate 11 from one front side to the receiving opening 22.

Figure 2:
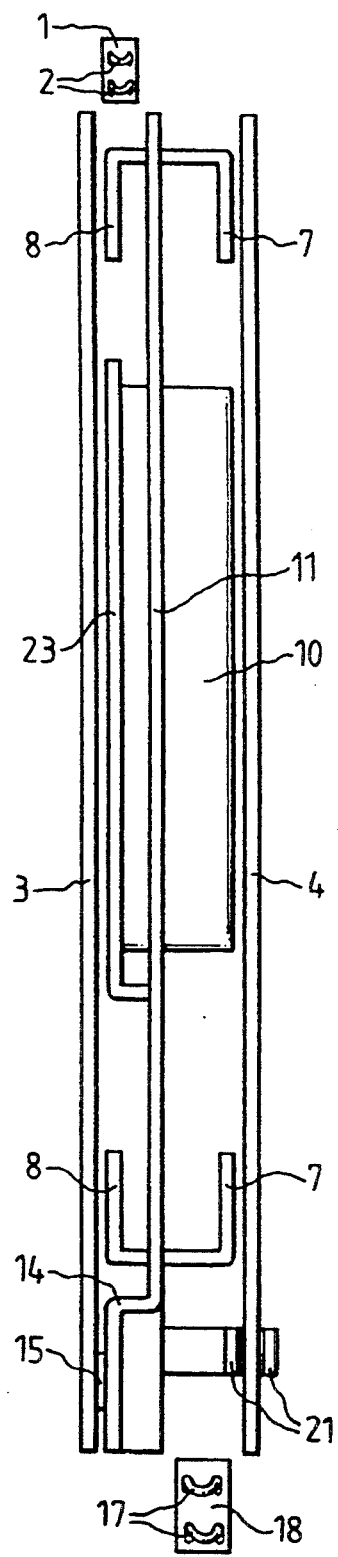
FIG. 2 is a simplified front view, with inwardly folded support plate.

At one corner of the support plate 11, the support 15 for the support plate 11 is formed of an offset portion 14 thereof, through which engages a support pin in a borehole being borne in the left-hand side wall 3 of the casing 24 in FIG. 2.

The bundle wire 5 attached with a predetermined remaining length at the support 1 is guided on the rear side of FIG. 1 and left-hand side of FIG. 2 of the support plate 11. The bundle wire 5 is attached by means of edge cable binders 13 at the support plate 11, inserted behind the left-hand side L-shaped lugs 8 and guided up to the splice 9 of the splice cassette 10 (in the receiving opening 22). The bundle wire 5 is received in clockwise manner, according to the illustration of FIG. 1, in the support plate 11 and is guided through the slot 12 in the support plate 12 and reaches on the right-hand side of FIG. 2 the receiving opening 22 for the splice cassette 10. The splice cassette 10 is a standard component, which is fixed by means of non-shown loosenable screw connection in the receiving opening 22. From the splice 9 of the splice cassette 10, the single wires 16 also extend in clockwise manner on the front side of FIG. 1 and on the right-hand side of FIG. 2 of the support plate 11, and are inserted there into the L-shaped lugs 7 and fixed by means of cable binders 6 in the edge section of the support plate 11. The single wires 16 then extend to a stationary support 18, the single wires 16 being attached thereat by means of cable binders 17. The further guiding of the single wires 16 and the supply of the bundle wire 5 are not shown in more detail.

For guiding the support plate 11 when folding it out from the casing 24 formed of the two side walls 3, 4, an L-shaped holding bracket 21 is formed at the corner of the support plate 11 opposite to the support 15 by a U-shaped free-cut from the support plate 11, and is guided in a curved slot 19 of the adjacent side wall 4 of the casing 24, the edge section of the slot 19 guiding the bent-off lug 25 of the L-shaped holding bracket 21 being provided with an inwardly bent-off offset portion 20, so that several casings 24 can be arranged tightly side-by-side.

The splice cassette 10 being ready on a splice table is, after the splicing process, attached in the receiving opening 22 of the support plate 11 by means of a non-shown screw connection, the bundle wire 5 having to be guided through the slot 12 and the single wires 16 not being twisted with the bundle wire 5. Then, the bundle wire 5 is, starting from the cable binders 13 fixing the latter to the support plate 11, inserted into the left-hand side L-shaped lugs 8, and depending on the remaining length of the bundle wire 5, several windings are possible. Subsequently, the single wires 16 are commonly placed under the right-hand side L-shaped lugs 7, starting from the fixed point formed by the cable binders 6, and depending on the remaining length of the single wires 16, several windings are also possible. The receiving spaces for the bundle wire 5 and the single wires 16 on both sides of the sheet-metal support plate 11 and formed by several sheet-metal lugs 7, 8, are dimensioned so large that even length tolerances of the remaining lengths can be accommodated. Thereafter, the support plate 11 is rotated by 90° about the support 15, upwardly into the casing 24, so that the support plate 11 is fully between the side walls 3 and 4. As an end stop for the two end positions, folded-out and folded-in positions, is provided the holding bracket 21 operating in the slot 19, the offset portion 20 of the edge section of the slot 19 sensing for permitting a lining-up of several casings 24, since it is thereby prevented that the holding bracket 21 will project with its lugs 25 over the outer face of the side wall 4.

When folding in, the bundle wire 5 is brought in place in a semi-circular curve of 180°. the single wires 16 will accept an S-shape about the support 18 and the lugs 7 of the support plate 11.

While a specific embodiment of the invention has been shown and described in detail to illustrate the application of the principles of the invention, it will be understood that the invention may be embodied otherwise without departing from such principles.

What is claimed is:

1. A device for storing both single wire glass fiber cables and bundle wire glass fiber cables in a distributor device of a telecommunication and data transfer system, comprising:
   a casing;
   at least one cassette box pivotably mounted in said casing;
   a splice cassette for holding a splice connection, joining glass fiber cables, said splice cassette being removably mounted in said cassette box, said cassette box including a support plate provided with a receiving portion for said splice cassette and having a slot for passing one of a single and bundle wire therethrough and supporting means located on each of two side faces of said support plate for supporting one of single and bundle wires.

2. A device according to claim 1, wherein:
   said receiving portion for said splice cassette is formed as a receiving opening provided in said support plate.

3. A device according to claim 2, wherein:
   said receiving opening for said splice cassette is formed as a central portion cut free in a U-shaped manner of said support plate, said central portion being bent off in an L-shaped manner onto one side of said support plate.

4. A device according to claim 1, wherein: said support plate is supported approximately centrally between two side walls of said casing.

5. A device according to claim 1, wherein: said supporting means include a plurality of lugs.

6. A device according to claim 1, wherein:
   said supporting means include wall portions bent off providing bent off areas.

7. A device according to claim 5, wherein:
   said lugs are formed at edge portions of said support plate in a U-shape manner and are bent off in an L-shaped manner onto opposite sides towards a central portion of said support plate.

8. A device according to claim 1, wherein:
   said support plate includes a bearing, pivotably mounting said support plate to said casing, said bearing being formed of an offset portion of said support plate provided at a corner of said support plate.

9. A device according to claim 8, wherein:
   at a corner of said support plate, opposite to said bearing, an L-shaped holding bracket is formed by cutting said support plate in a U-shaped manner, said L-shaped holding bracket being guided in a curved slot of a side wall of said casing, adjacent to said L-shaped holding bracket.

10. A device according to claim 9, wherein:
    a bent-off lug is provided extending from said L-shaped holding bracket, said slot including an edge portion with an off set region for receiving said bent-off lug.

* * * * *